(12) United States Patent
Krikke et al.

(10) Patent No.: US 9,645,714 B2
(45) Date of Patent: May 9, 2017

(54) USER INTERFACE FOR A MEDIA PROCESSING APPARATUS

(71) Applicant: OCE TECHNOLOGIES B.V., Venlo (NL)

(72) Inventors: Nanne Krikke, Nijmegen (NL); Jacoba A. H. Jansen, Venlo (NL); Ronald R. F. Dongelmans, Nijmegen (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 238 days.

(21) Appl. No.: 14/133,058

(22) Filed: Dec. 18, 2013

(65) Prior Publication Data

US 2014/0173438 A1    Jun. 19, 2014

(30) Foreign Application Priority Data

Dec. 19, 2012    (EP) .................................... 12198048

(51) Int. Cl.
*G06F 3/0484* (2013.01)
*G03G 15/00* (2006.01)
*B65H 45/12* (2006.01)
*G03G 15/36* (2006.01)

(52) U.S. Cl.
CPC ........... *G06F 3/0484* (2013.01); *B65H 45/12* (2013.01); *G03G 15/36* (2013.01); *G03G 15/502* (2013.01); *G03G 15/652* (2013.01); *B65H 2551/15* (2013.01); *B65H 2551/18* (2013.01); *B65H 2551/21* (2013.01); *B65H 2551/26* (2013.01); *B65H 2551/27* (2013.01)

(58) Field of Classification Search
CPC .............. G06F 3/0484; B65H 2551/15; B65H 2551/18; B65H 2551/21; B65H 2551/26; B65H 2551/27; B65H 45/12; G03G 15/502; G03G 15/652

See application file for complete search history.

(56) References Cited

U.S. PATENT DOCUMENTS

| 7,890,881 B1 * | 2/2011 | Skidgel ................. G06F 17/212 715/243 |
| 2003/0086720 A1 | 5/2003 | Song |
| 2003/0226460 A1 * | 12/2003 | Kim ........................ B41F 13/56 101/232 |

(Continued)

FOREIGN PATENT DOCUMENTS

| EP | 1 939 011 A1 | 7/2008 |
| JP | 2006-202112 A | 8/2006 |
| JP | 2010-116241 A | 5/2010 |

*Primary Examiner* — Eric J Bycer
(74) *Attorney, Agent, or Firm* — Birch, Stewart, Kolasch & Birch, LLP (57) ABSTRACT

A user interface for a media processing apparatus is adapted to process image receiving media so as to determine a physical configuration of a media sheet. The user interface includes a screen, a controller adapted to receive image data specifying an image to be received on a sheet and to control the screen so as to display a preview showing the sheet with the image received thereon, an input section adapted to input preview editing commands, and an output section adapted to output set commands for the media processing apparatus. The controller is adapted to derive the set commands from the preview editing commands.

11 Claims, 7 Drawing Sheets

(56) References Cited

U.S. PATENT DOCUMENTS

| | | | |
|---|---|---|---|
| 2005/0076295 A1* | 4/2005 | Simske | G06K 9/00442 |
| | | | 715/243 |
| 2005/0094205 A1* | 5/2005 | Lo | G06F 17/243 |
| | | | 358/1.18 |
| 2006/0026927 A1 | 2/2006 | Stemmle | |
| 2006/0114529 A1 | 6/2006 | Oh | |
| 2007/0285681 A1 | 12/2007 | Hayakawa | |
| 2009/0059289 A1 | 3/2009 | Shintoku et al. | |
| 2010/0027056 A1 | 2/2010 | Ogino et al. | |
| 2012/0020513 A1* | 1/2012 | Outram | G06F 17/212 |
| | | | 382/100 |
| 2012/0250071 A1* | 10/2012 | Miller | G06F 3/1205 |
| | | | 358/1.15 |
| 2013/0045851 A1* | 2/2013 | Hori | G03G 15/5095 |
| | | | 493/405 |

\* cited by examiner

USER INTERFACE FOR A MEDIA PROCESSING APPARATUS

CROSS-REFERENCE TO RELATED APPLICATIONS

This application claims priority under 35 U.S.C. §119(a) to Application No. 12198048.6, filed in Europe on Dec. 19, 2012, the entire contents of which is hereby incorporated by reference into the present application.

BACKGROUND OF THE INVENTION

1. Field of the Invention

The present invention relates to a user interface for a media processing apparatus adapted to process image receiving media so as to determine a physical configuration of a media sheet.

2. Description of Background Art

The media processing apparatus may, for example, comprise one or more reels on which the image receiving media are stored in the form of uncut webs with different widths. Then, the apparatus will further comprise a drive mechanism for selectively driving the reels so as to pay out the desired web, and a cutting mechanism for cutting off a sheet with a desired length. The sheet may then be set to a print engine for printing an image thereon.

Another example of a media processing apparatus to which the present invention is applicable is a folding machine that is used for folding a sheet in accordance with a certain folding pattern.

SUMMARY OF THE INVENTION

It is an object of the present invention to provide a user interface that facilitates the input of setting instructions that determine the physical configuration, e.g. the size or the folding pattern, of the media sheets.

In order to achieve this object, the user interface according to the present invention comprises a screen; a controller adapted to receive image data specifying an image to be received on a sheet and to control the screen so as to display a preview showing the sheet with the image received thereon; an input section adapted to input preview editing commands; and an output section adapted to output set commands for the media processing apparatus, wherein the controller is adapted to derive the set commands from the preview editing commands.

User interfaces capable of displaying a preview of an image to be printed are known already for printers that print on pre-cut media sheets in standard formats. Some of these user interfaces also offer a possibility to edit the preview, e.g. by scaling or rotating the image to be printed.

Whereas, in the known user interfaces, the preview editing commands are used for determining the appearance of the image to be printed, the present invention proposes to use preview editing commands for determining the physical configuration of the media sheets. This offers a very easy and intuitive way of entering the settings for the media processing apparatus.

The input section of the controller may comprise conventional input devices such as a keyboard and a mouse for controlling the position of a cursor on the screen, and the like. In a preferred embodiment, the screen is a touch-sensitive screen, and the input section processes commands that are entered by touching the screen with one or more fingers and moving the finger or fingers over the screen, as is well known for touch screens of smart phones. In any case, the user may employ familiar input techniques for activating certain elements of the preview, e.g. an edge or a corner of the media sheet, and may change the physical configuration, e.g. the size of the sheet, by moving that element over the screen. The controller will translate these operations into set commands which determine the appropriate settings of the media processing apparatus, e.g. a command selecting a reel with an appropriate width and/or determining the cut position of the cutting mechanism.

In another mode of operation, the width and/or length of the sheet may be determined implicitly by the size of the image to be printed. Then, the user may scale or rotate the image in the preview, and the size of the sheet will automatically adapt to the resulting size and posture of the image, possibly with the addition of blank edge margins or strips, the size of which may also be configured graphically on the preview screen.

When the user has selected a mode of operation in which the size of the sheet is determined directly by manipulating the edges of the sheet, a manipulation of the image in the preview may have the effect that the image is moved relative to the sheet. In this mode of operation, the user may also select an option to scale the image such that it fits into the selected size of the sheet.

Preferably, the controller is also adapted to show predefined standard formats for the sheet on the preview screen. In a particularly preferred embodiment, the user may select an option causing the edges of the sheet to snap-in at the sizes corresponding to the standard formats, so that an explicit or implicit manipulation of the sheet size by editing commands of the user causes the size of the sheet (in at least one dimension) to jump to the standard format that fits best to the input of the user.

When the media processing apparatus is formed by or comprises a folding apparatus, the concepts outlined above apply equivalently to settings concerning the positions of fold lines that will be displayed on the preview screen.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
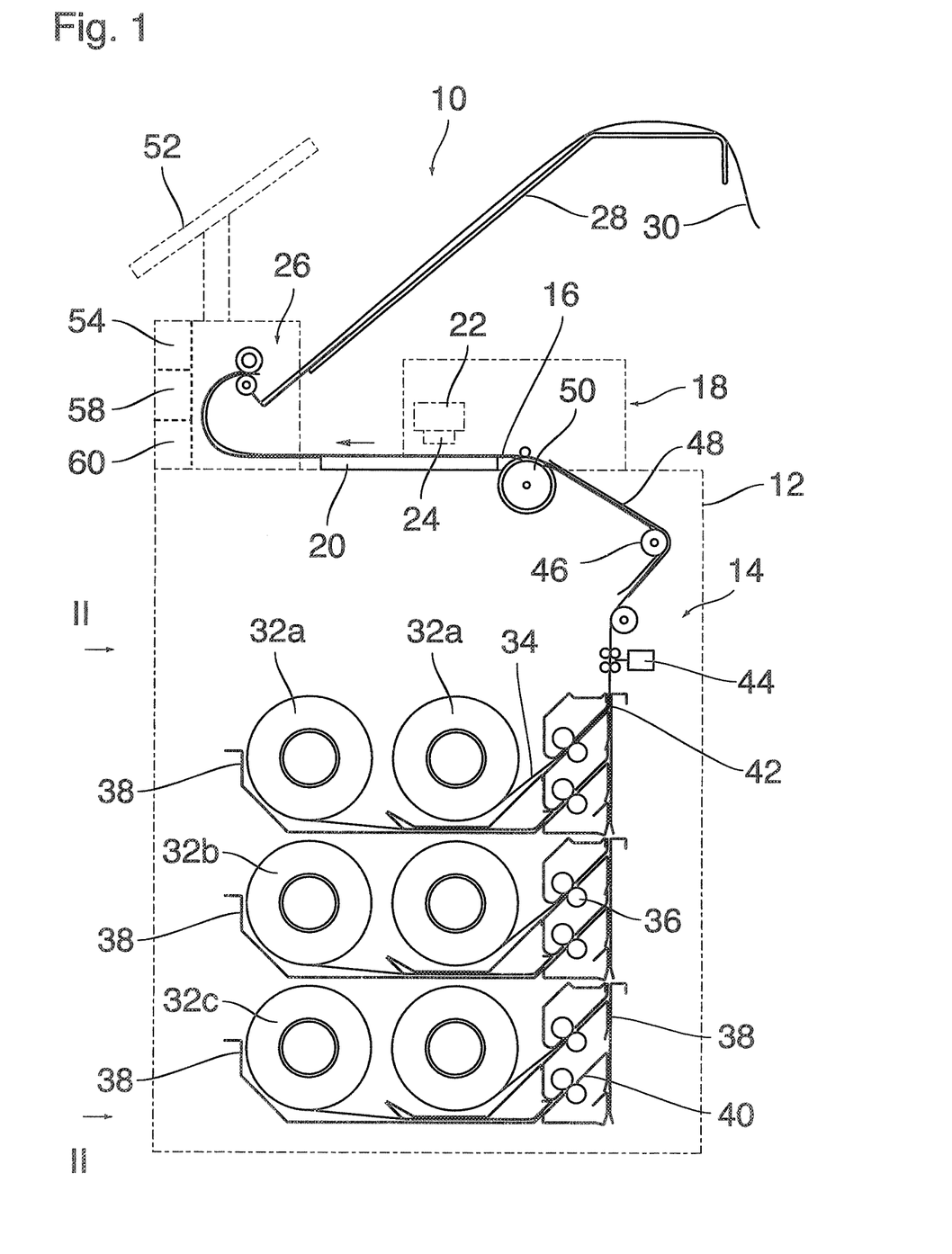
FIG. 1 is a schematic view of a printer having a media processing apparatus and a user interface according to the present invention.

As is shown in FIG. 1, an ink jet printer 10 is a roll printer and has a frame 12 (shown in phantom lines) which accommodates a media processing apparatus 14 adapted to feed a sheet 16 of a print medium (paper) to a print station 18 on the top side of the frame 12. In the print station 18, the sheet 16 is sucked against a flat top surface of a perforated sheet support plate 20 by means of a vacuum system. A carriage 22 is arranged to travel back and forth across the sheet 16 in the direction normal to the plane of the drawing in FIG. 1 and carries at its bottom side a number of ink jet print heads 24 facing the sheet 16. Thus, by energizing the print heads 24, a swath of an image is printed in each pass of the carriage 22. Then, the sheet 16 is advanced by a step of appropriate length in a direction indicated by an arrow A, so that the next swath can be printed. A discharge mechanism 26 discharges the sheet onto a tray 28 which, in the example shown, accommodates already a printed sheet 30.

The media processing apparatus 14 comprises three pairs of reels/rolls 32a, 32b, 32c, each providing a supply of printing paper in the form of an endless web 34. The pairs of reels/rolls are arranged in three levels, and the web 34 from each reel/roll is drawn-off by means of a respectively associated pair of transport rollers 36. An arrangement of guide plates 3-8 defines a branched system of narrow feed paths 40, which merge into a common feed path 42. The transport rollers 36 are selectively driven to feed the web 34 from a selected one of the reels/rolls 32a, 32b, 32c to the common feed path 42. It will be understood that the reels/rolls 32a, 32b, 32c may contain paper of different qualities and possibly also non-paper recording media such as plastic films or the like.

From the common feed path 42, the selected web is guided past a cutting mechanism 44 for cutting the web to the desired sheet length, and then the cut sheet 16 is guided over a system of deflection and tensioning rollers 46 and guide plates 48 to a feed roller 50 from which it is paid out onto the sheet support plate 20.

A user interface comprises a screen 52, a touch screen in this example, and an interface controller 54 that has an input section 56 (FIG. 2) connected to the screen 52 and an output section 58 connected to a sheet processing and print controller 60.

The media processing and print controller 60 controls a number of drive motors for the transport rollers 36 as well as the cutting mechanism 44, and it further controls the print station 18.

From the output section 58, the media processing and print controller 60 receives set commands which specify the width and the length of the sheet 16.

Figure 2:
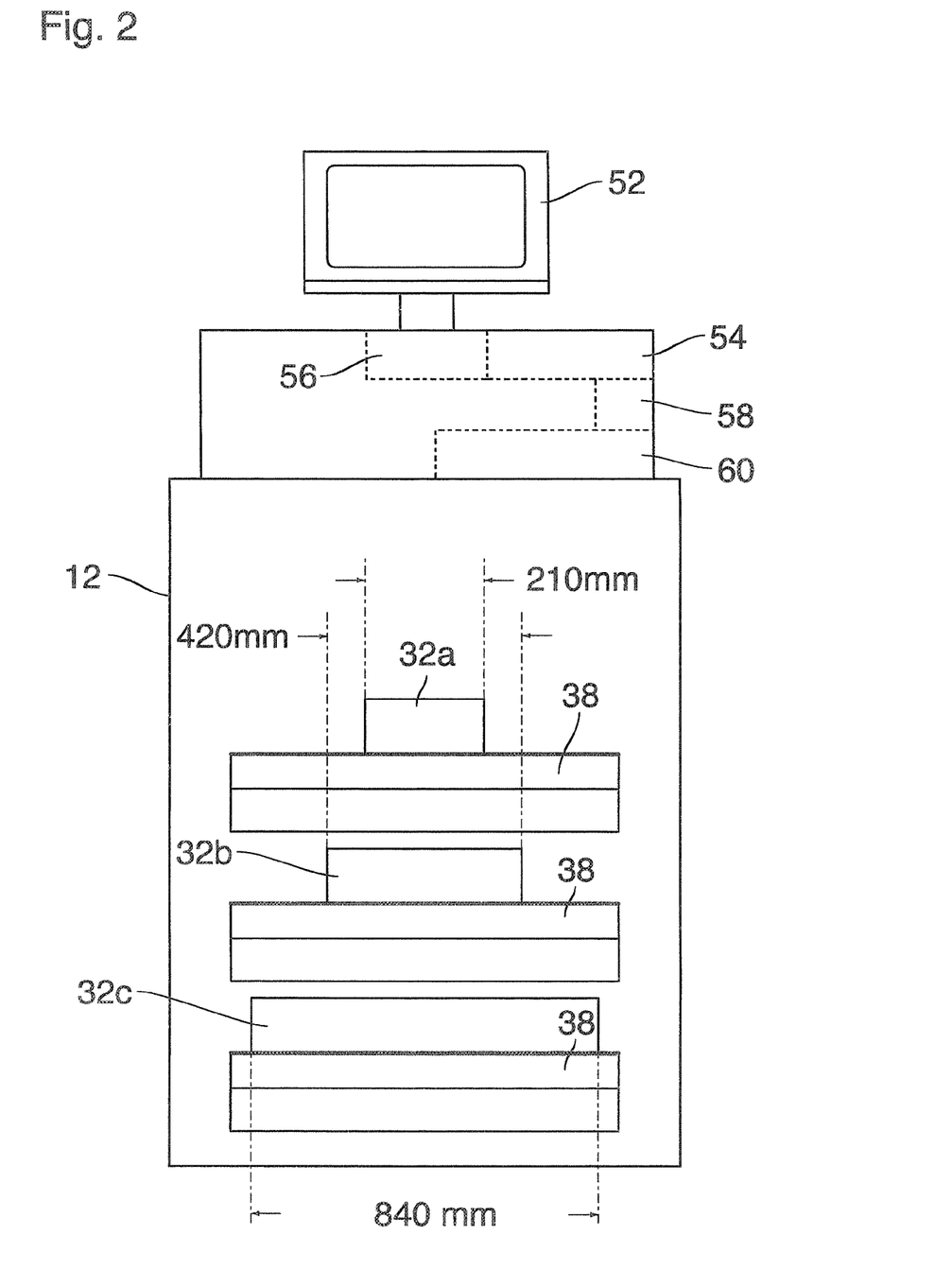
FIG. 2 is a schematic view of a media storage section of the media processing apparatus, as seen in the direction of arrows II-II in FIG. 1.

As is further shown in FIG. 2, the reels 32a, 32b, 32c have different widths. The two reels 32a in the top level accommodate a web with a width of about 210 mm, corresponding to the format A5-landscape and A4-portrait. The reels 32b accommodate webs with a width of approximately 420 mm corresponding to A3-landscape and A2-portrait. The reels 32c accommodate webs with a width of about 840 mm, corresponding to A1-landscape and A0-portrait. Thus, by controlling the print station 18 to print the image in an appropriate orientation, it is possible to cover all standard formats from A5 to A0.

Dependent upon the set commands received from the output section 58, the media processing and print controller 60 controls the drive motors for the transport rollers 36 that are associated with the reel that has the desired width. Further, the controller 60 controls the length of the web that is paid out before the web is stopped and the cutting mechanism 44 is activated. In this way, the length of the sheet 16 can be set to a value specified by the set command.

Figure 3:
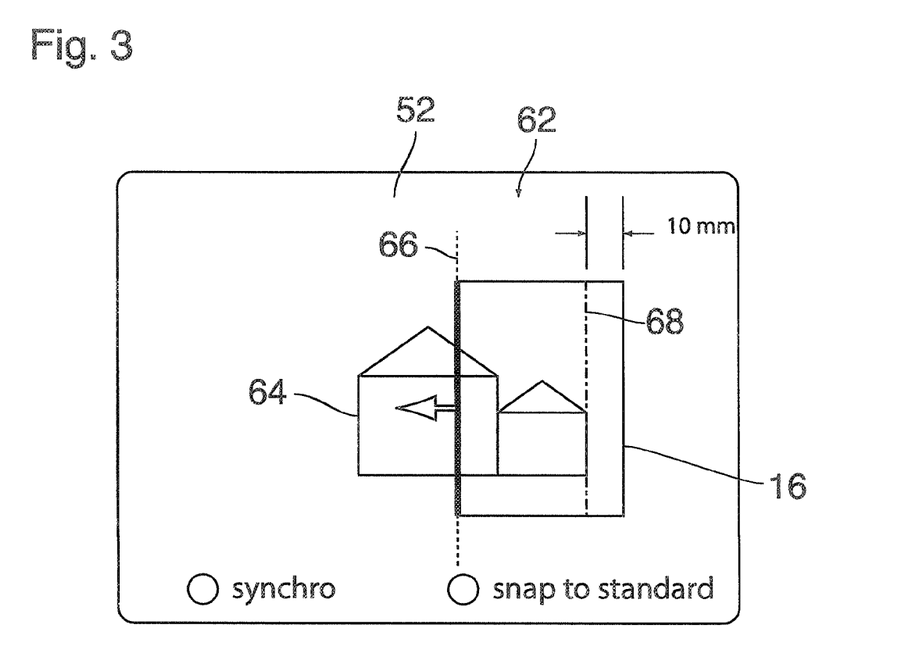
FIGS. 3 to 12 are simplified screen shots of a screen of the user interface.

FIG. 3 is a screenshot of the screen 52 showing a preview 62 of an image 64 to be printed in association with an outline of the sheet 16. Further, the preview includes a vertical line representing a cut line 66 along which the web will be cut by the cutting mechanism 44 in accordance with the current settings. Thus, the horizontal direction in FIG. 3 is the lengthwise direction of the web, and the vertical dimension of the sheet 16 in FIG. 3 corresponds to the width of the web.

Figure 4:
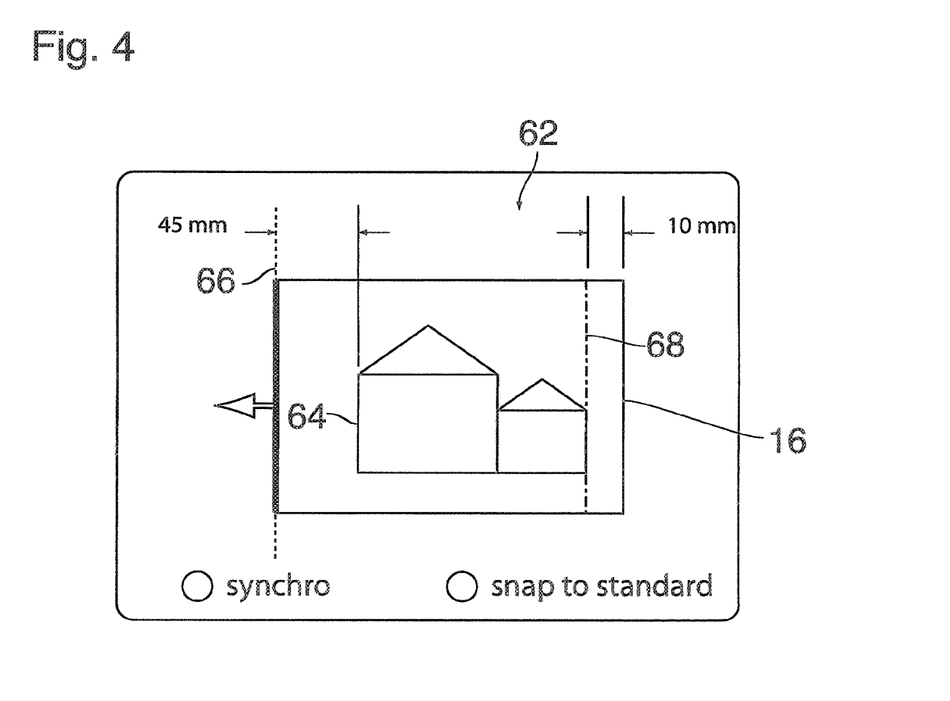

In the example shown, the image 64 does not fit into the area of the sheet 16, so that the size of the sheet should be increased. In order to effect a corresponding change of the settings, the user may tap with his finger onto the position of the left edge of the sheet 16 or alternatively onto the cut line 66 in the preview. As a result, the edge and the cut line, respectively, are activated. This has been symbolized here by highlighting the left edge of the sheet 16 as a bold line. Then, as is symbolized by an arrow in FIG. 3, the user may move his finger to the left over the touch screen, whereupon the controller 54 animates a movement of the cut line 64 to the left. The result is shown in FIG. 4. When the user lifts his finger off the screen in this position, the cut line 66 will be set to the position shown in FIG. 4, and the cut sheet will accordingly have a greater length.

In addition, as is shown in FIG. 4, the controller determines the position of the leftmost point of the image 64 and quantitatively indicates the distance between the cut line 66 and the boundary of the image 64 (45 mm in this example) so as to make it easier for the user to set the width of a blank strip at the leading edge of the sheet. As an alternative or in addition, although not shown in the drawings, the total width and length of the sheet 16 may be displayed.

In the example shown in FIGS. 3 and 4, the user has further specified a blank strip with a width of 10 mm at the leading edge of the sheet 16. Accordingly, the image 64 has automatically been positioned such that the rightmost boundary of the image coincides with a strip line 68 that indicates the width of the trailing strip. When a user wants to change the width of the trailing strip, the procedure is analogous to the one for shifting the cut line 66, i.e. the strip line 68 is activated with a finger tap and then moved horizontally across the screen to the desired new position. The position of the image 64 will adapt automatically, so that the user may then re-adjust the cut line 66, if necessary.

Figure 5:
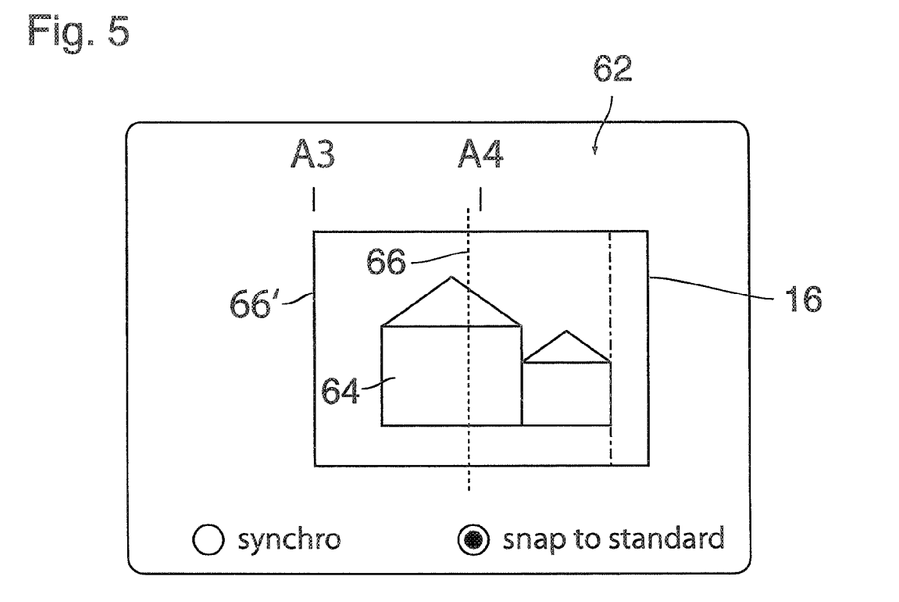

Optionally, the target positions of the cut line 66 for standard formats of the sheet 16 may also be displayed in the preview, as has been shown in FIG. 5. In this example, the user has further ticked (checked) an option "snap to standard" (activated by a finger tap on the corresponding tick box). This option causes the controller 54 to accept only standard sheet formats. For example, when the user has moved the cut line 66 to the position shown in FIG. 5, which is slightly beyond the mark for A4, then the cut line will automatically jump to a position 66' that corresponds to the next larger standard format A3.

In an alternative embodiment, the snap function may be implemented such that the cut line 66, when moved with the finger tip of the user, will always snap-in at the mark (e.g. A4 or A3) which is closest to the finger tip of the user. However, the reason for shifting the cut line 66 at all will normally be that the image 64 does not fit into the area of the sheet, so that the sheet must be made larger. Thus, it is more convenient that the cut line jumps to the next larger standard format as soon as it has been moved beyond the mark for the smaller format.

Figure 6:
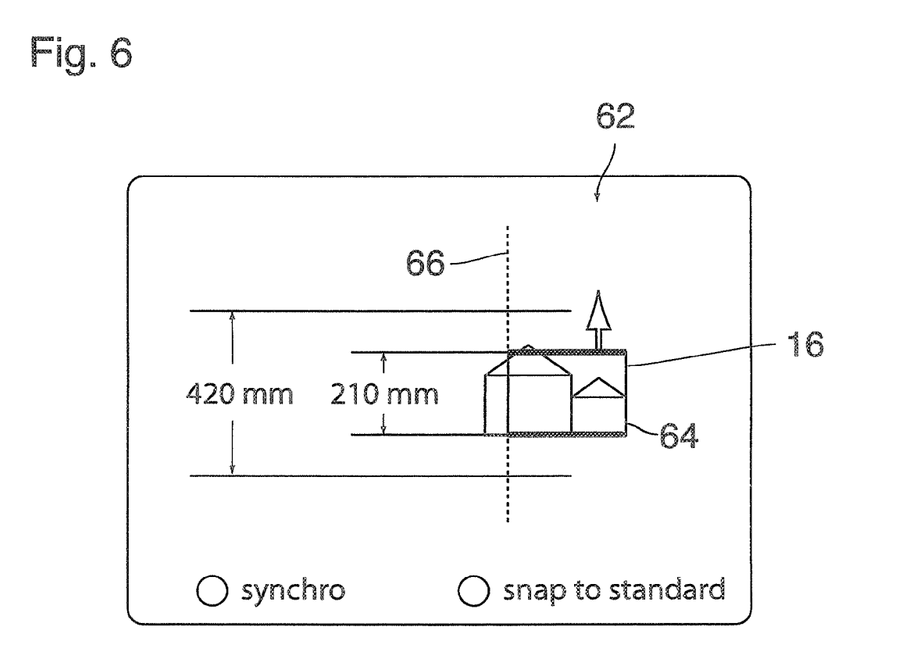

As has been illustrated in FIG. 6, a similar snap function is implemented for the width of the sheet 16, i.e. the vertical dimension in the drawing. In this example, the width of the sheet 16 had initially been set to 210 mm, which is too small to accommodate the image 64. In order to increase the width of the sheet, the user may for example tap onto the top or bottom edge of the sheet, with the result that both edges are activated (symbolized by bold lines in FIG. 6). Then, when the user moves his finger upward as indicated by an arrow in FIG. 6, the top edge will move upwards whereas the bottom edge moves downwards, and the width of the sheet 16 will automatically snap-in at the next available standard width which is 420 mm in this example. The reason for moving the top and bottom edge of the sheet 16 simultaneously and mirror-symmetrically is that, in this example, the default position of the image 64 is a position in which it is centered in height onto the horizontal (lengthwise) center line of the sheet.

In a modified embodiment, the bottom edge of the sheet 16 (in the drawing) may be kept stationary, so that only the top edge can be moved in order to adjust the width of the sheet. Then, the controller may automatically animate a movement of the image 64 by a distance corresponding to one half of the displacement of the top sheet edge, so as to keep the image in the vertical center position of the sheet, thereby increasing the likelihood that the image will fit into the area of the sheet.

It will be observed that, in FIG. 6, the option "snap to standard" has not been ticked (checked). It is convenient that the snap function for the width dimension of the sheet is always active, because, unlike the length of the sheet, the width cannot be selected freely, but is limited to the available widths of the webs on the reels 32a, 32b, 32c.

Figure 7:
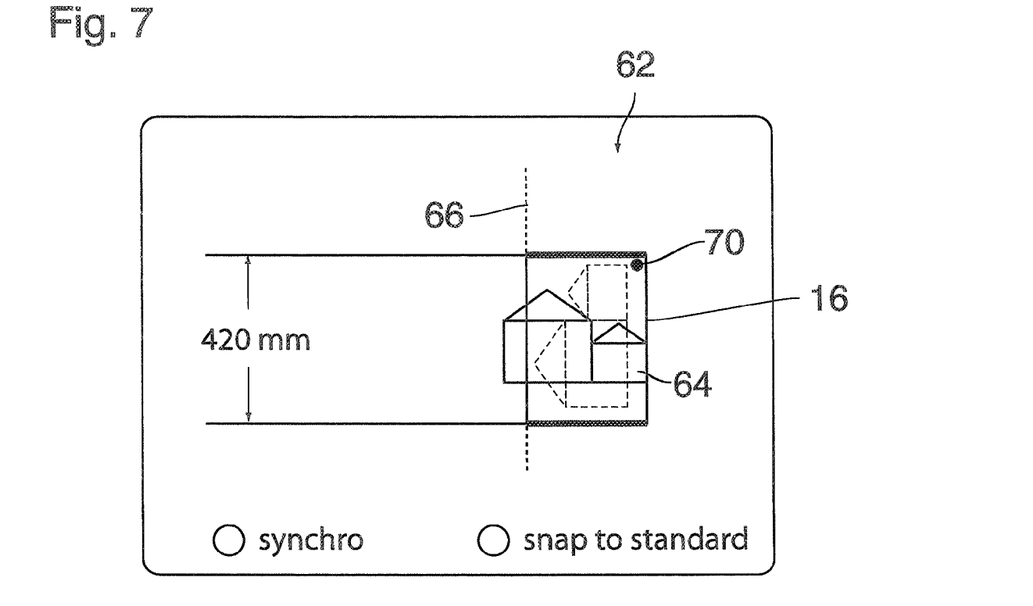

FIG. 7 shows the result of the increase of the width of the sheet 16. It can be seen that, in this example, the image 64 still does not fit into the area of the sheet 16 because the length of the sheet (horizontal dimension in FIG. 7) is too small. One remedy would be to move the cut line 66 to the left, as has been explained before. As an alternative, it could be tested whether the image would fit into the area of the sheet if it is rotated by 90°. In order to perform such a rotation of the image relative to the sheet, the user only needs to press with his finger onto a point 70, which corresponds to the top left corner of the sheet 16. This will cause the controller to automatically animate a rotation and re-centering of the image 64 as has been indicated in dashed lines in FIG. 7. It can be seen that the rotated image does indeed fit into the area of the sheet.

In order to command a rotation of the image by 180°, the user would have to press onto the top left corner of the sheet 16 in FIG. 7, and in order to perform a 90° rotation in an opposite direction, he would have to press onto the bottom left corner of the sheet in FIG. 7. Generally, the image will always be rotated (in steps of 90°) such that the corner on which the user has pressed will be the bottom right corner of the image (the corner where normally the legend is found in technical drawings).

Of course, the user may also command free rotations of the image 64 about any angle as well as movements of the image relative to the sheet 16 in the usual way, i.e. by activating the image (tapping with the finger into the image area) and then moving the finger over the desired distance in the desired direction or gesturing a rotation about the desired angle by rotating two finger tips on the touch screen. Similarly, the image 64 may be scaled by spreading the two finger tips after the image has been activated (similar to scaling a map on a smartphone). In the modes of operation that have been described so far, such manipulations of the image 64 will have no effect on the configuration of the sheet 16.

Other useful gestures involve a wiping movement with the finger over the screen. For example, if the user wants to align the leftmost boundary of the image with the cut line 66 (if no strip line has been defined for that edge of the sheet), then he may simply wipe with his finger to the left. As another example, if the user has moved the image 64 to the center of the sheet 16 in FIG. 4, and he wants to re-align the rightmost boundary of the image with the strip line 68, this may be achieved simply by wiping over the screen in the rightward direction. Analogously, vertical wiping movements may align the image with the upper or lower edge of the sheet 16, and diagonal wipes may align a corner of a bounding rectangle of the image 64 with the corresponding corner of the sheet (or the central part of the sheet, except the blank strips or margins, respectively). It will be understood that blank margins at the lengthwise edges of the sheet (top and bottom edges in the drawings) may be defined and configured in the same way as the strips at the leading and trailing edges.

Figure 8:
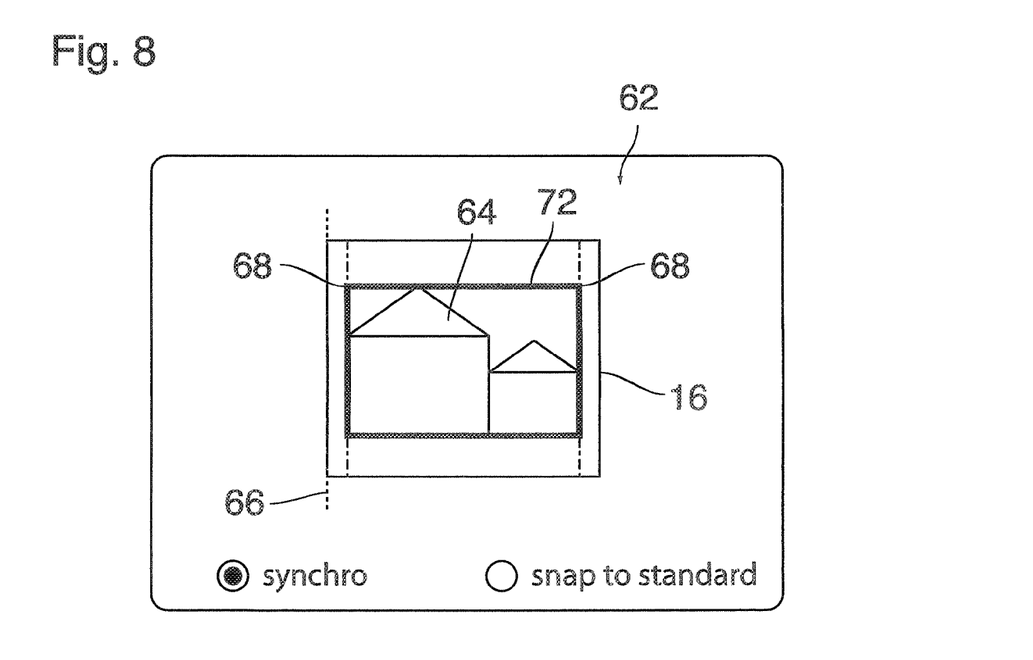

In FIG. 8, the user has activated an option "synchro" by pressing onto an associated tick (check) box. This switches the controller 54 into a different mode of operation. In this mode, the movements of the cut line—and optionally also the changes of the sheet width—are synchronized with manipulations, especially scaling and rotation, of the image 64.

FIG. 8 illustrates an example where the user has defined strip lines 68 symmetrically for both the leading edge and the trailing edge of the sheet, in the manner that has been described before. Then, in the synchro-mode, the controller will automatically place the image 64 such that its right boundary coincides with the right strip line 68, and the cut line 66 will automatically be placed such that its distance from the left strip line 68 corresponds to the specified strip width. Optionally, in this mode, the image 64 may automatically be centered onto the sheet 16 in a vertical direction, and the vertical dimension (width) of the sheet may automatically be selected such that it corresponds to the smallest web width in which the image 64 will fit.

When, now, the user wants to rotate or scale the image 64, he will activate the image by tapping in with his finger into the image area. As a result, a highlighted (bold lines) bounding rectangle 72 for the image 64 will be shown, as has been illustrated in FIG. 8. Then, the user may command a scaling or rotation of the image with the usual two-finger gestures.

Figure 9:
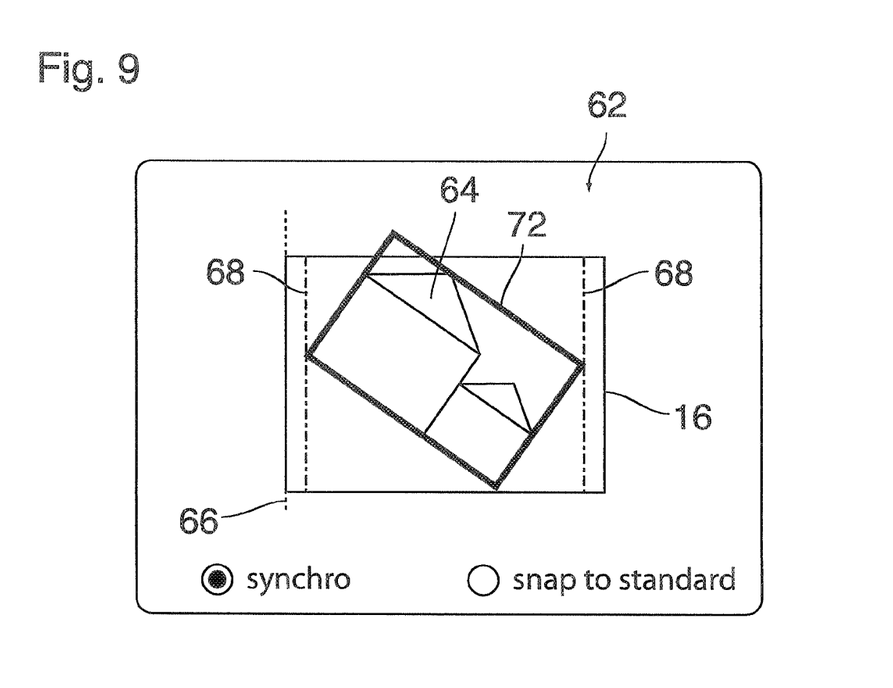

FIG. 9 illustrates a rotation of the image. It can be seen that the preview 62 automatically adapts such that the rightmost corner of the bounding rectangle 72 is kept on the right strip line 68, whereas the cut line 66 is shifted so as to keep its distance from the left strip line 68.

In the example shown, the image 64 still fits into the width of the sheet 16 (although the bounding rectangle does not), so that the width of the sheet 16 does not need to be altered. If the image 64 exceeds beyond the top or bottom edge of the sheet 16, a web with the next higher width would automatically be selected, and the image of the sheet 16 in the preview would be adapted accordingly.

In an alternative embodiment, the controller 54 may be configured such that, instead of keeping the rightmost corner of the bounding rectangle 72 on the strip line 68 (or on the trailing edge of the sheet 16), it would be the rightmost point of the image 64 itself that is kept on this strip line or edge while the cut line 66 follows the position of the leftmost point of the image.

Figure 10:
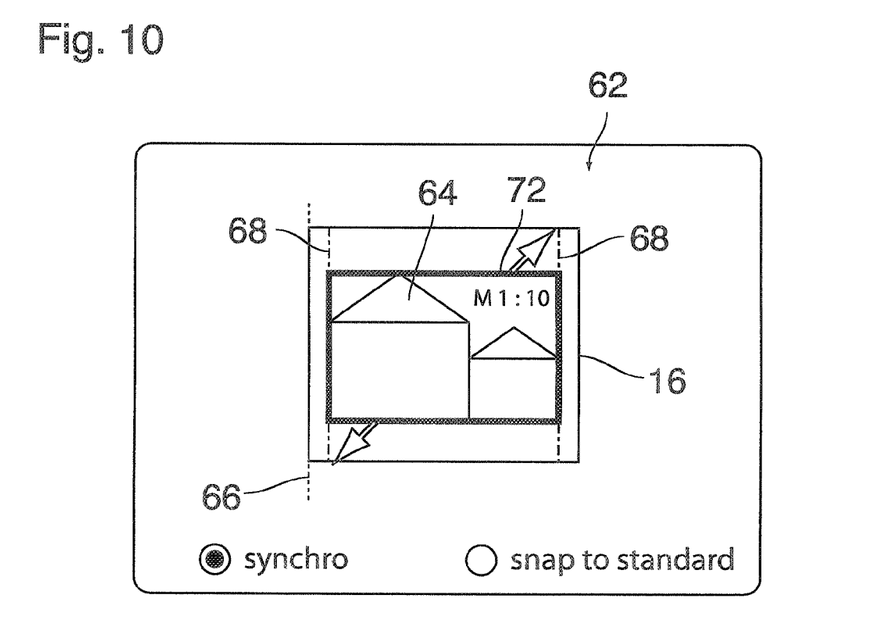
Figure 11:
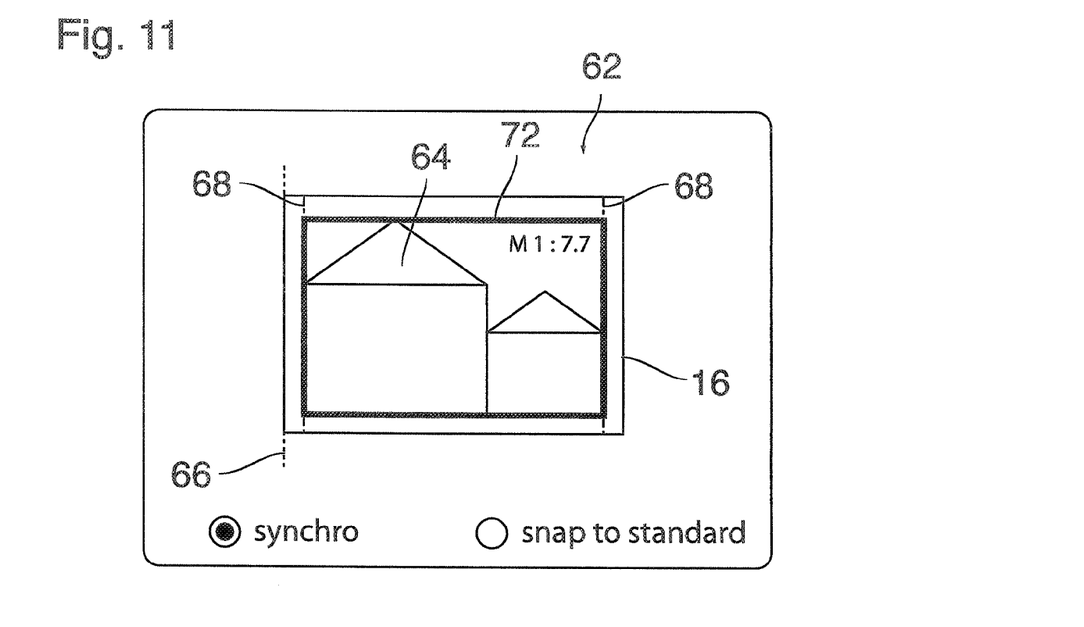

FIGS. 10 and 11 illustrate an example where the image 64 is scaled rather than being rotated. As is common practice for technical drawings, the scale ratio (M1:10) of the drawing has been indicated (and will be printed) in the image. The user has activated the image and then spreads his fingers in diagonal direction as has been indicated by arrows in FIG. 10 so as to enlarge the image 64. Then, as is shown in FIG. 11, the preview 62 is automatically adapted such that the rightmost edge of the image 64 is kept on the strip line 68 and the cut line 66 keeps its distance from the left strip line 68. Again, the width of the sheet 16 may also be adapted, if necessary.

In the example shown, the print station 18 is further controlled such that the corrected scale ratio (M1:7.7 in this example) is automatically printed in the image.

In the examples described in conjunction with FIGS. 9 to 11, it is a manipulation of the image 64 that controls the change of the configuration of the sheet 16. However, the synchro-mode may also operate in the inverse direction. Then, the user activates and shifts the cut line 66 and/or the top and bottom edges of the sheet 16 as in FIGS. 4 to 6, and the image 64 will automatically be scaled such that it fits into the area of the sheet 16 (or the area left between the strip lines 68, respectively).

Further, it will be understood that the option (snap to standard) is also available in the synchro-mode, with the only reservation being that the widths of the strips that are delimited by the strip lines 68 must be understood as minimum widths.

Figure 12:
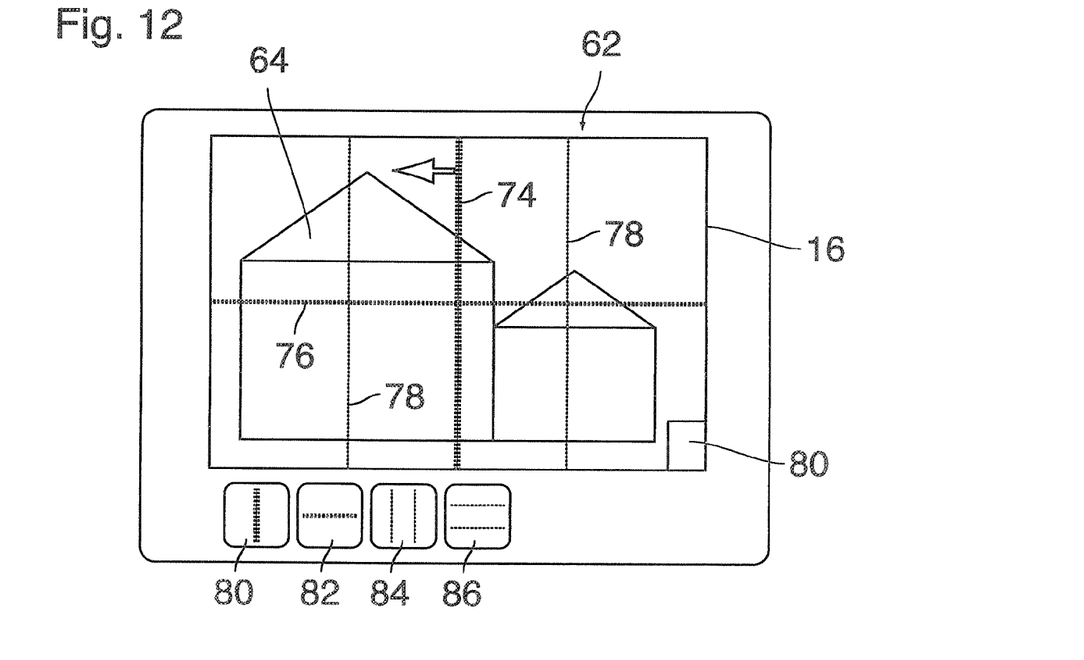

FIG. 12 is a screen shot for an example where the printer 10 is combined with a folding apparatus (not shown) that is also controlled by the media processing and print controller 60. The preview 62 shown in FIG. 12 includes the image 64 and the sheet 16 and, in addition, a pattern of fold lines 74, 76 and 78 overlaid on the screen. These fold lines indicate the lines along which the sheet 16 will be folded in the folding apparatus. In the example shown, the sheet would first be folded along a vertical fold line 74, the folded package would then be folded along a horizontal fold line 76, and, finally, this package would again be folded along fold lines 78 which, due to the first folding step, would be superposed one upon the other. As a default setting, the positions of the fold lines may be specified such that they divide the area of the sheet into a number of rectangles with equal shapes and equal sizes (if the sheet is of standard format) or, if the sheet is not of a standard format, into a number of rectangles with standard format and a remainder of smaller rectangles.

Since the preview 62 shows the image 64 together with the fold lines 74-78, the user may check whether a fold line or a crossing of fold lines would compromise the visibility or clarity of a critical detail in the image. Then, the user may choose to shift the image relative to the sheet and, accordingly, relative to the fold lines. In the present embodiment, however, the user also has the option to change the settings of the folding apparatus such that the fold lines are shifted relative to the sheet. The corresponding set commands are entered following the principles that have been described above for the positioning of the cut line and the strip lines. For example, in order to shift the main fold line 64 to the left, the user may activate this fold line on the touch screen and move it to the left as indicated by an arrow. In the same way, the horizontal fold line 76 may be moved upwardly or downwardly. In case of the fold lines 78, the user may activate any of these and move it in the desired direction, with the consequence that the other fold line 78 will be moved symmetrically with respect to the main fold line 74.

The user may further change the configuration of the folded package by deleting fold lines. This may be done by activating the fold line to be deleted and then pressing a delete button (not shown) or by "whiping the fold line away."

Conversely, the user may change the folding pattern by adding fold lines. For example, when no fold lines are defined initially, the user may press a button 80 for adding a first vertical fold line 74 to be formed in a first folding step. If the folding apparatus is capable of making a plurality of parallel folds in one folding step (e.g. in leporello style), the button 80 may be pressed several times for adding a plurality of vertical first fold lines, which may then be positioned as desired. Similarly, a first horizontal fold line 76 may be added by pressing a button 82. A button 84 will add fold lines 78 to be folded after the first vertical folds have been made, and a button 86 will add horizontal fold lines to be made after the first horizontal folding step(s) (fold line 76) has been made.

In this embodiment, the "snap to standard" option may be used to assure that the folded package will be in a standard format.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A user interface apparatus for a media processing apparatus adapted to process image receiving media so as to determine a physical configuration of a media sheet, the user interface apparatus comprising:
   a screen;
   a controller configured to receive image data specifying an image to be received on the media sheet and to control the screen so as to display a preview showing the media sheet with the image received thereon;
   an input section configured to input preview editing commands; and
   an output section configured to output set commands for the media processing apparatus,
   wherein the controller is configured to:
      derive a first set command from the preview editing commands and output the first set command specifying a folding pattern for the sheet, the folding pattern specifying a plurality of fold lines,
      animate a movement of at least one cut or fold line in the preview in response to editing commands input via the input section,
      generate a second set command that is dependent upon a position to which said at least one cut or fold line has been moved by means of a user gesture on the screen independently from other fold lines in the folding pattern,
      derive a dedicated set command for each individual fold line of the folding pattern,
      derive a third set command from the preview editing commands and output the third set command specifying an addition or deletion of a fold line in the folding pattern for the sheet, and
      derive a fourth set command from the preview editing commands and output the fourth set command specifying a shift of a fold line or a crossing of fold lines relative to the sheet such that the shift of the fold line or crossing of the fold lines does not compromise the visibility or clarity of a detail in the image.

2. The user interface apparatus according to claim 1, wherein the controller is further configured to output a fifth set command determining a length of the sheet to be cut from an uncut web that is drawn from a reel in the media processing apparatus.

3. The user interface apparatus according to claim 2, wherein the controller is further configured to output a seventh set command specifying a width of the sheet by selecting one of a plurality of reels in the media processing apparatus, from which a web is to be cut.

4. The user interface apparatus according to claim 1, wherein the controller is further configured to output a sixth set command specifying a width of the sheet by selecting one of a plurality of reels in the media processing apparatus, from which a web is to be cut.

5. The user interface apparatus according to claim 1, wherein another one of said at least one cut or fold line represents an edge of the sheet extending in a direction normal to said cut line.

6. The user interface apparatus according to claim 1, wherein said at least one cut or fold line includes at least one strip line specifying a blank margin along an edge of the sheet.

7. The user interface apparatus according to claim 1, wherein the controller is further configured to process preview editing commands that manipulate the image to be received on the sheet and to adapt all the set commands to the manipulated image.

8. The user interface apparatus according to claim 1, wherein the controller is further configured to manipulate the image to be received on the sheet in accordance with the preview editing commands that determine the size of the sheet in at least one dimension.

9. The user interface apparatus according to claim 1, wherein the controller is further configured to show predefined standard formats for the sheet on the preview screen, and by a manipulation of the sheet size by the preview editing commands, the sheet size snaps in at size of one of the standard formats.

10. The user interface apparatus according to claim 1, wherein the user interface apparatus has a default setting, wherein:
   if the sheet is of a standard format, the positions of the fold lines are specified such that the fold lines divide the sheet into a number of rectangles with equal shapes and equal sizes, and
   if the sheet is not of the standard format, the positions of the fold lines are specified such that the fold lines divide the sheet into a number of rectangles with a standard format and a remainder of small rectangles.

11. A roll printer comprising a user interface apparatus adapted to process image receiving media so as to determine a physical configuration of a media sheet, wherein the user interface apparatus comprises:
   a screen;
   a controller configured to receive image data specifying an image to be received on the media sheet and to control the screen so as to display a preview showing the media sheet with the image received thereon;
   an input section configured to input preview editing commands; and
   an output section configured to output set commands for the media processing apparatus,
   wherein the controller is configured to:
      derive a first set command from the preview editing commands and output the first set command specifying a folding pattern for the sheet, the folding pattern specifying a plurality of fold lines,
      animate a movement of at least one cut or fold line in the preview in response to editing commands input via the input section,
      generate a second set command that is dependent upon a position to which said at least one cut or fold line has been moved by means of a user gesture on the screen independently from other fold lines in the folding pattern,
      derive a dedicated set command for each individual fold line of the folding pattern,
      derive a third set command from the preview editing commands and output the third set command specifying an addition or deletion of a fold line in the folding pattern for the sheet, and
      derive a fourth set command from the preview editing commands and output the fourth set command specifying a shift of a fold line or a crossing of fold lines relative to the sheet such that the fold line or the crossing of the fold lines does not compromise the visibility or clarity of a detail in the image.

* * * * *